United States Patent
Konik et al.

(10) Patent No.: US 9,173,103 B2
(45) Date of Patent: Oct. 27, 2015

(54) SIGNAL SECURITY FOR WIRELESS ACCESS POINT

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/168,143

(22) Filed: Jan. 30, 2014

(65) Prior Publication Data

US 2015/0215785 A1     Jul. 30, 2015

(51) Int. Cl.
*H04L 29/06* (2006.01)
*H04W 12/08* (2009.01)

(52) U.S. Cl.
CPC ............. *H04W 12/08* (2013.01); *H04L 63/083* (2013.01)

(58) Field of Classification Search
USPC ............................................... 726/7; 455/411
See application file for complete search history.

(56) References Cited

U.S. PATENT DOCUMENTS

| | | | |
|---|---|---|---|
| 7,346,477 B2 | 3/2008 | Desai et al. | |
| 7,359,363 B2 * | 4/2008 | Sakai | 370/338 |
| 7,426,383 B2 | 9/2008 | Wang et al. | |
| 8,325,753 B1 | 12/2012 | Bharghavan et al. | |
| 8,350,666 B2 | 1/2013 | Kore | |
| 2011/0072286 A1 | 3/2011 | Graham | |
| 2011/0083165 A1 | 4/2011 | Gopinath et al. | |
| 2011/0130119 A1 * | 6/2011 | Gupta et al. | 455/411 |
| 2013/0007848 A1 | 1/2013 | Chaskar et al. | |
| 2014/0201531 A1 * | 7/2014 | Toy et al. | 713/171 |
| 2014/0213219 A1 * | 7/2014 | Mohebbi | 455/411 |

OTHER PUBLICATIONS

Anonymous, "Password cracking," Wikipedia, http://en.wikipedia.org/wiki/Password_cracking.
Anonymous, "Elcomsoft Wireless Security Auditor," Elcomsoft Proactive Software, Copyright © 2000-2013 Elcomsoft Co. Ltd., http://www.elcomsoft.com/ewsa.html (accessed Sep. 13, 2013).
Anonymous, "Risk Management of Wireless Networks," OCC Advisory Letter, Comptroller of the Currency Administrator of National Banks, AL 2003-10, Dec. 9, 2003.
"Workshop on Enhancing Access to the Radio Spectrum (EARS)," National Science Foundation to Address Wireless Gridlock, Media Advisory 10-019, Aug. 2, 2010.
Rodoplu, V. et al., "Minimum Enery Mobile Wireless Networks," IEEE Journal on Selected Areas in Communications, vol. 17, No. 8, Aug. 1999.

* cited by examiner

*Primary Examiner* — Jason Lee
(74) *Attorney, Agent, or Firm* — Scott S. Dobson; James R. Nock

(57) ABSTRACT

A wireless access point receives a set of invalid passwords from at least one wireless device attempting to connect to a network through the wireless access point. The wireless access point reduces RF signal power in response to receiving the set of invalid passwords.

12 Claims, 4 Drawing Sheets

SIGNAL SECURITY FOR WIRELESS ACCESS POINT

BACKGROUND

The present disclosure relates to wireless network connections, and more specifically, to security of wireless access points.

Early computers usually communicated with each other with a wired local area network (LAN). However, due to the wide use of mobile devices (such as mobile phones, notebook computers, and personal digital assistants (PDAs)), wireless local area networks (WLANs) have evolved into one of the major ways of communication between computers. WLANs effectuate communication by means of various wireless media, such as radio signals and infrared signals.

Recent years see the rapid and across-the-board growth of portable computing. In addition to wire connection, portable computing relies heavily on a backbone network and a connected WLAN in order to access various network resources.

Among a wide variety of WLANs, IEEE 802.11 (also known as WiFi) is in wide and intensive use. IEEE 802.11b, g,n adopt an ISM (Industrial, Scientific, Medical) frequency band that ranges between 2,400 MHz and 2,483.5 MHz. The ISM frequency band is applicable to a spread spectrum system worldwide without requiring a permit.

FIG. 1 is a schematic view of WLAN authentication of IEEE 802.11. To start using a wireless local area network (WLAN), a mobile device has to perform message-based communication in three stages, namely probe request 160/probe response 164, authentication request 167/authentication response 172, and association request 176/association response 180, in their order of occurrence in time. The three stages of message-based communication are regulated by IEEE 802.11.

In the WLAN, a wireless client typically accesses, via an access point, resources available on a backbone network. The backbone network is usually a cable network (such as Ethernet), another wireless network, or a combination thereof. When an access point enables access to the resources available on a cable network, the access point includes at least a cable network interface, a bridge function, and a wireless network interface, so as to perform traffic bridging between a wireless network and the cable network.

Due to the wide use of WLANs, network security is a concern that is becoming more important. A WLAN effectuates data transmission by means of radio waves. That is to say, any wireless client within a service area covered by an access point can send data to the access point or receive data from the access point. Conventional WLANs enhance user security by means of service set identifiers (SSID), open or shared key identity authentication, Wired Equivalent Privacy (WEP) keys, media access control (MAC), Wi-Fi Protected Access (WPA), etc.

Compared with a wired local area network, although WLANs manifest greater mobility to users, WLANs attach great importance to communication security. These features of WLANs are especially important, considering that wired local area networks are less vulnerable.

SUMMARY

According to embodiments of the present disclosure, a method for providing signal security for a wireless access point is disclosed. The method includes receiving a first set of invalid passwords from at least one wireless device. The at least one wireless device is attempting to connect to the network through the wireless access point. The method further includes reducing RF signal power of the wireless access point in response to receiving the first set of invalid passwords.

Also disclosed herein are embodiments of a wireless access point. The wireless access point includes an authentication module configured to receive a first set of invalid passwords from at least one wireless device. The at least one wireless device is attempting to connect to a network through the wireless access point. The wireless access point also includes an RF signal power adjustment module configured to reduce power of a RF signal in response to the authentication module receiving the first set of invalid passwords.

Also disclosed herein are embodiments of a computer program product for securing a wireless access point. The computer program product includes a computer readable storage medium having program code embodied therewith. The program code is executable by a computer system to perform a method. The method includes receiving a first set of invalid passwords from at least one wireless device. The at least one wireless device is attempting to connect to the network through the wireless access point. The method further includes reducing RF signal power of the wireless access point in response to receiving the first set of invalid passwords.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
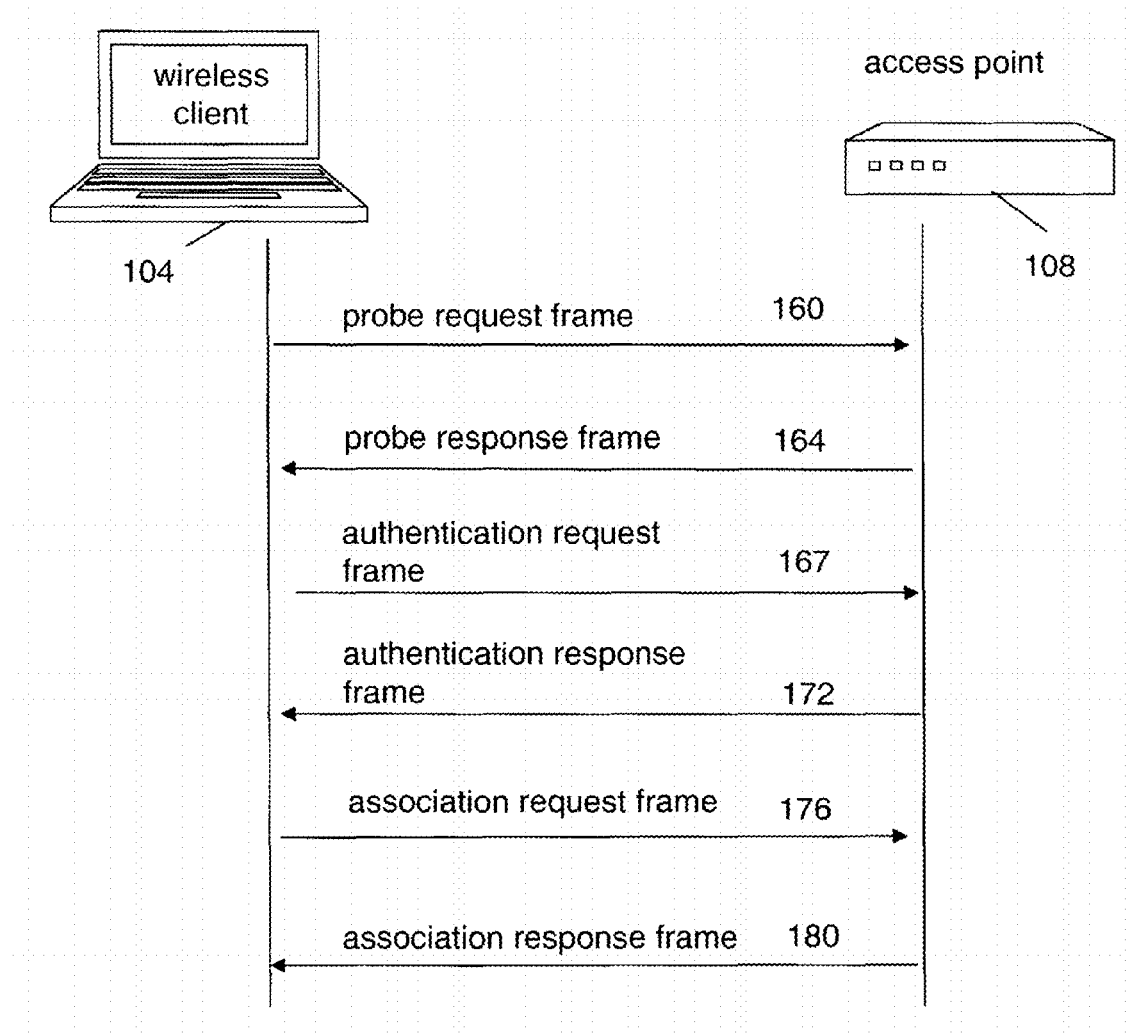
FIG. 1 depicts a schematic view of WLAN authentication of IEEE 802.11.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to security of a wireless access point, more particular aspects relate to reducing the power of the RF signal of a wireless access point in response to receiving a set of invalid passwords. While the present disclosure is not necessarily limited to such applications, various aspects of the disclosure may be appreciated through a discussion of various examples using this context.

Embodiments of the present invention may provide a wireless access point which reduces the power of its RF signal in response to receiving a set of invalid passwords during the authentication process. This may allow the access point to prevent hackers from obtaining access to a computer network by preventing them from retrieving the RF signal after attempting one or more invalid passwords.

The wireless access point may reduce the power of its RF signal in response to receiving a particular number of invalid passwords which make up the set of invalid passwords. The particular number may be preconfigured for the access point, may be user configured, or may change dynamically based on certain factors. In some embodiments, the number may be only one. For example, the wireless access point may reduce the power of its RF signal in response to receiving one invalid password. In some embodiments, the power of the RF signal may be reduced when a particular number of invalid passwords are received consecutively. For example, if the number is 100, the wireless access point may reduce the power of its RF signal in response to receiving a set of 100 invalid passwords without receiving an intervening valid password. In some embodiments, the particular number of invalid passwords refers to invalid passwords that are received within a specified time period. For example, the wireless access point may reduce the power of its RF signal if it receives 100 invalid passwords within an hour, regardless of any intervening valid passwords.

Figure 2:
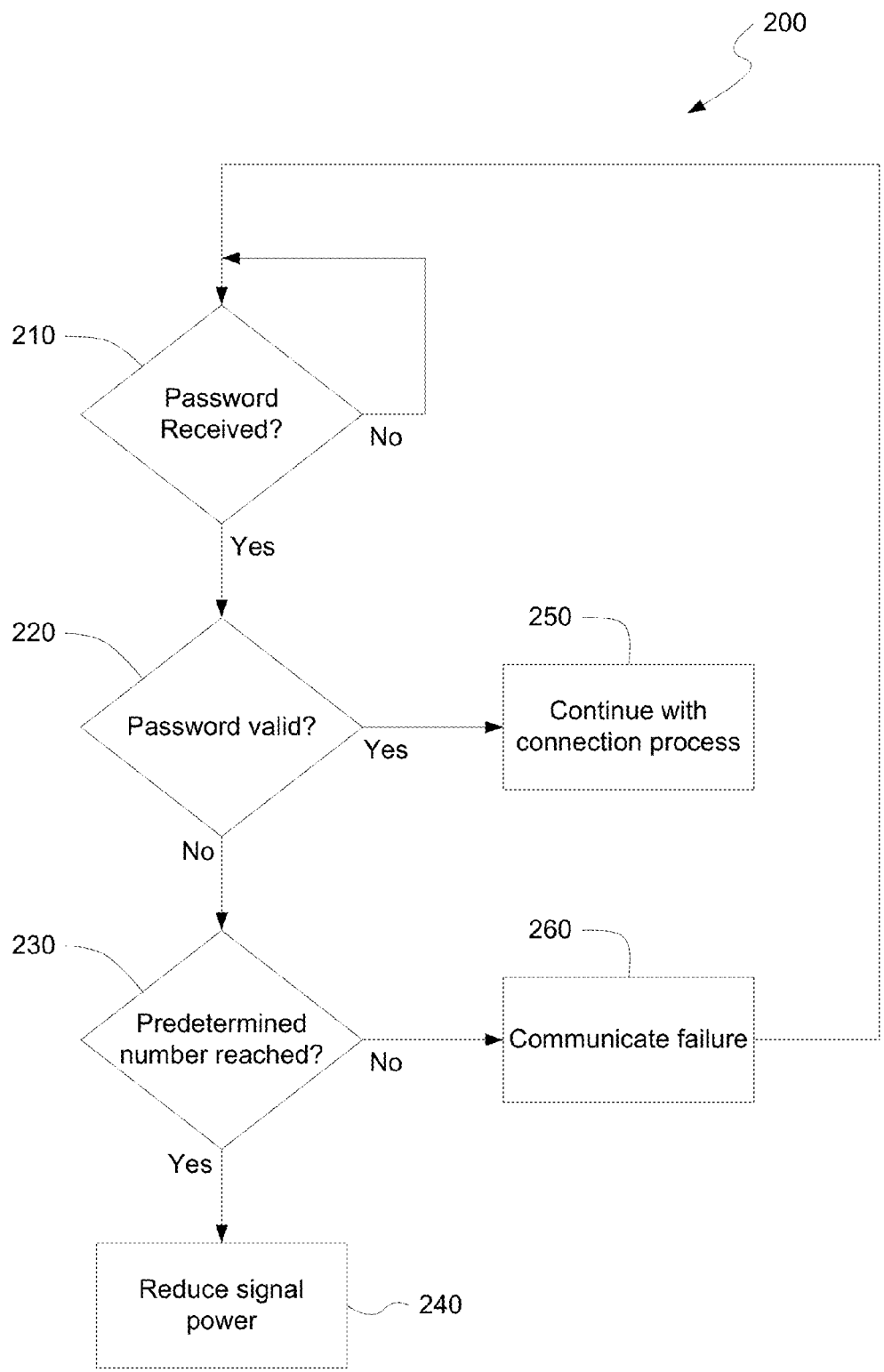
FIG. 2 depicts a flow diagram of an example method for securing the RF signal of an access point.

Referring to FIG. 2, a flow diagram 200 of an example method for securing the RF signal of a wireless access point is depicted. At step 210, the wireless access point determines if a password has been received. This may occur during the authentication process between the wireless device and the access point. If a password has been received, method 200 may proceed to step 220. At step 220, the access point determines if the password is valid. If the password is valid, method 200 may proceed to step 250 and continue with the connection process. If the password is invalid, method 200 may proceed to step 230, log the invalid password and determine if a particular number of invalid passwords received has been reached.

In some embodiments, it is determined if the particular number of invalid passwords have been received consecutively. This may be passwords received consecutively from all wireless devices or may be passwords received consecutively from a single wireless device. In some embodiments, it is determined if the particular number of invalid passwords have been received within a specified time period. For example, if the number is 50, the number may be reached if 50 consecutive invalid passwords have been received or if 50 invalid passwords have been received within an hour. In some embodiments, the number may be different for different periods of time, such as 10 in the last 10 seconds, 20 in the last minute, or 100 in the last hour. In some embodiments, the number of invalid passwords received may be divided by the number of connected devices. For example, 25 invalid passwords may be reasonable from 25 connected devices, but not from a single device. The numbers and time periods may be configurable by a user as a setting of the access point.

If the particular number of invalid passwords has not been reached, method 200 may proceed to step 260 and communicate to the wireless device that the password was invalid. If the particular number of invalid passwords has been reached, method 200 may proceed to step 240 and reduce the power of the wireless access point's RF signal. The power may be reduced to any level. In some embodiments the power may be reduced by a certain percentage. For example, the power may be reduced from 100% to 90%. If the power has been previously reduced after receiving a set of invalid passwords, the power may be reduced from 90% to 80%. In some embodiments, the power may be reduced completely so that the RF signal is disabled. In some embodiments, the power may be reduced to a lower power in response to a first invalid password and reduced to no power in response to a second, later occurring invalid password.

In some embodiments, the power of the RF signal may be reduced to a level which results in a particular signal strength for a connected wireless device. The wireless device may communicate the signal strength detected by its signal strength utility to the access point and the RF signal power may be reduced until the signal strength is at a particular level. In some embodiments, the particular signal strength may be determined dynamically based on the requirements of the connected devices. This may allow for a validly connected wireless device to maintain an acceptable connection with the wireless access point while preventing a hacker from receiving the signal if the hacker is further from the access point.

Additionally, in some embodiments, the access point may direct the RF signal toward a connected wireless device. The direction may be determined using the GPS location of the wireless device and the wireless access point, or may be determined by varying the direction of the RF signal and receiving the signal strength from the validly connected wireless device. This may allow for a validly connected wireless device to maintain an acceptable connection with the wireless access point while preventing a hacker from receiving the signal if the hacker is located in a different direction. Similarly, in some embodiments, the access point may direct the RF signal away from the wireless device which communicated an invalid password.

Figure 3:
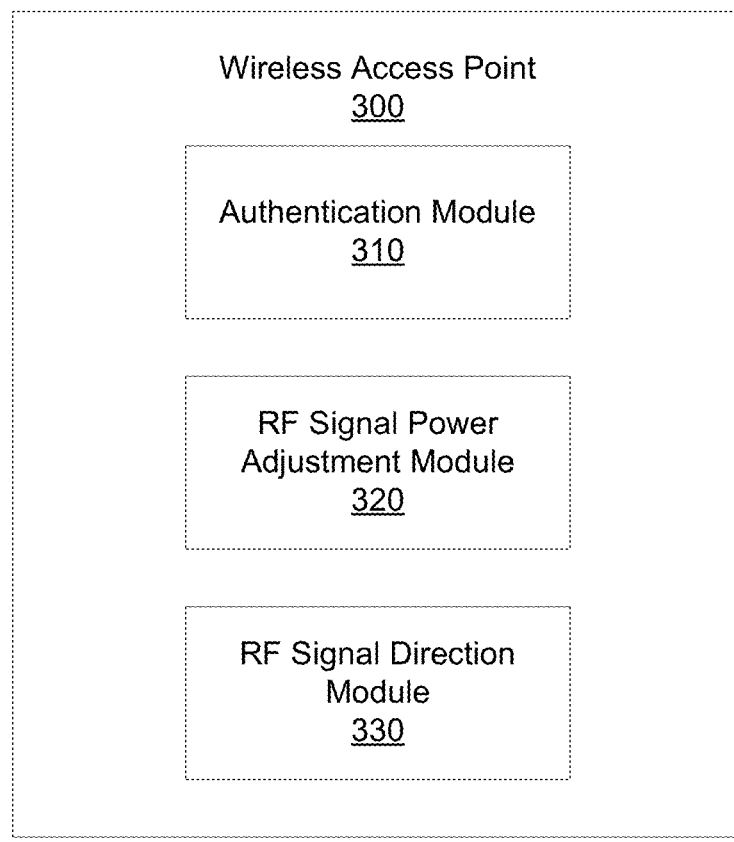
FIG. 3 depicts a block diagram of an example wireless access point for reducing RF signal power in response to receiving an invalid password.

Referring to FIG. 3, a block diagram of an example wireless access point 300 for reducing RF signal power in response to receiving an invalid password is depicted. Wireless access point 300 contains authentication module 310, RF signal power adjustment module 320, and RF signal direction module 330. Authentication module 310 may receive passwords from wireless devices attempting to connect to wireless access point 300 and determine if the passwords are valid. Authentication module 310 may track invalid passwords received. This may include the number of invalid passwords received consecutively or the number of invalid passwords received in a specified period of time. If the passwords are invalid, authentication module may determine if a particular number of invalid passwords has been reached consecutively or in a specified period of time. RF signal power adjustment module 320 may reduce the power of the RF signal when the number of invalid passwords is reached. RF signal direction module 330 may direct the signal toward a validly connected wireless device when the number of invalid passwords is reached.

Figure 4:
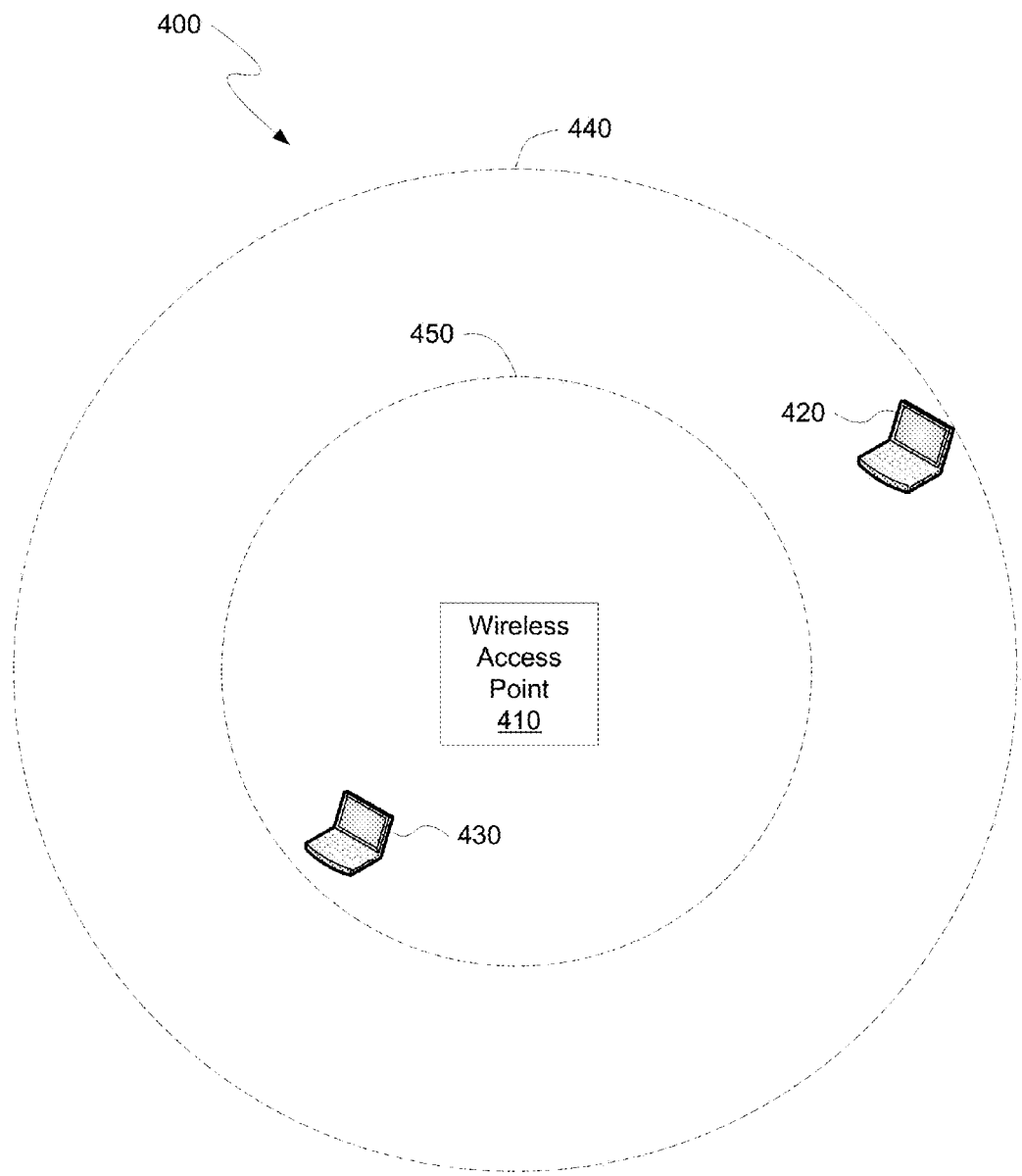
FIG. 4 depicts a diagram of an example wireless network system.

Referring to FIG. 4, a diagram of an example wireless network system 400 is depicted. Wireless access point 410 may be operating with a first RF signal range 440. RF signal range 440 may be associated with a first RF signal power, such as the maximum RF signal power. Hacker 420 may attempt to connect to wireless access point 410 using an invalid password. In response, wireless access point 410 may reduce the power level of its RF signal which results in a second RF signal range 450. Hacker 420 may be unable to access the RF signal at range 450. Wireless device 430 may be validly connected to wireless access point 410. At RF signal range 450, wireless device 430 may still be able to communicate with wireless access point 410.

The present invention may be embodied in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A wireless access point device comprising:
one or more hardware processors; and
a non-transitory computer readable storage medium, the computer readable storage medium having program code embodied therewith, the program code executable by the one or more hardware processors to perform steps comprising:
receiving a first set of invalid passwords from at least one wireless device, the at least one wireless device attempting authentication with the wireless access point device with passwords, the first set of invalid passwords received with a RF signal at a first power level, the first power level producing a first RF signal range, the RF signal adjusts power level range around the wireless access point device that a wireless device is able to communicate with the wireless access point device using a wireless connection; and
reducing power of the RF signal to a second power level in response to receiving the first set of invalid passwords, the second power level producing a second RF signal range, the second RF signal range smaller than the first range.

2. The wireless access point device of claim 1, wherein the second power level is no power such that the RF signal is disabled.

3. The wireless access point device of claim 1, wherein the first set of invalid passwords comprises a number of invalid passwords received consecutively.

4. The wireless access point device of claim 1, wherein the first set of invalid passwords are received within a specified time period, and wherein the reducing power of the RF signal occurs in response to the first set of invalid passwords being received within the specified time period.

5. The wireless access point device of claim 1, wherein the second power level is determined based on a signal strength detected by a signal strength utility on a connected wireless device and communicated to the wireless access point device.

6. The wireless access point device of claim 1, wherein the steps further comprise:
directing the RF signal toward a connected wireless device based on GPS location of the wireless device and the wireless access point device.

7. A computer program product for securing a wireless access point, the computer program product comprising a non-transitory computer readable storage medium having program code embodied therewith, the program code executable by a computer system to perform steps comprising:
receiving a first set of invalid passwords from at least one wireless device, the at least one wireless device attempting authentication with the wireless access point device with passwords, the first set of invalid passwords received with a RF signal at a first power level, the first power level associated with a first RF signal range, the RF signal adjusts power level range around the wireless access point device that a wireless device is able to communicate with the wireless access point device using a wireless connection; and
reducing power of the RF signal to a second power level in response to receiving the first set of invalid passwords, the second power level associated with a second RF signal range, the second range smaller than the first RF signal range.

8. The computer program product of claim 7, wherein the first set of invalid passwords comprises a particular number of invalid passwords received consecutively.

9. The computer program product of claim 7, wherein the first set of invalid passwords are received within a specified time period, and wherein the reducing power of the RF signal occurs in response to the first set of invalid passwords being received within the specified time period.

10. The computer program product of claim 7, wherein the second power level is no power such that the RF signal is disabled.

11. The computer program product of claim 7, wherein the second power level is determined based on a signal strength detected by a signal strength utility on a connected wireless device and communicated to the wireless access point device.

12. The computer program product of claim 7, wherein the steps further comprise:
directing the RF signal toward a connected wireless device based on GPS location of the wireless device and the wireless access point device.

* * * * *